(12) United States Patent
Min et al.

(10) Patent No.: US 9,904,129 B2
(45) Date of Patent: Feb. 27, 2018

(54) LIGHT MODULATION DEVICE

(71) Applicant: LG CHEM, LTD., Seoul (KR)

(72) Inventors: Sung Joon Min, Daejeon (KR); Su Jin Kim, Daejeon (KR); Doo Hoon Song, Daejeon (KR); Jin Hyong Lim, Daejeon (KR); Dong Hyun Oh, Daejeon (KR); Ki Hwan Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/122,267

(22) PCT Filed: Mar. 6, 2015

(86) PCT No.: PCT/KR2015/002187
§ 371 (c)(1),
(2) Date: Aug. 29, 2016

(87) PCT Pub. No.: WO2015/133862
PCT Pub. Date: Sep. 11, 2015

(65) Prior Publication Data
US 2016/0377902 A1    Dec. 29, 2016

(30) Foreign Application Priority Data

Mar. 7, 2014 (KR) .......... 10-2014-0027222
Mar. 6, 2015 (KR) .......... 10-2015-0031541

(51) Int. Cl.
*G02F 1/1343* (2006.01)
*B60J 7/043* (2006.01)
(Continued)

(52) U.S. Cl.
CPC .......... *G02F 1/13439* (2013.01); *B60J 7/043* (2013.01); *E06B 9/24* (2013.01); *G02B 5/282* (2013.01);
(Continued)

(58) Field of Classification Search
CPC ................ G02F 1/13439; G02F 1/167; G02F 1/133509; G02F 1/137; G02F 1/155;
(Continued)

(56) References Cited

U.S. PATENT DOCUMENTS 4,749,261 A    6/1988   McLaughlin et al.
5,408,353 A    4/1995   Nichols et al.
(Continued)

FOREIGN PATENT DOCUMENTS

CN    102253559 A    11/2011
JP    H02-037326 A    2/1990
(Continued)

OTHER PUBLICATIONS

Search Report and Written Opinion issued for International Application No. PTC/KR2015/002187 dated May 26, 2015 (11 pages).
(Continued)

*Primary Examiner* — Anne Hines
*Assistant Examiner* — Jose M Diaz
(74) *Attorney, Agent, or Firm* — Rothwell, Figg, Ernst & Manbeck, P.C.

(57) ABSTRACT

Provided are a light modulation device and a use thereof. The light modulation device may apply an external signal by a composite layer having a high transmittance in a visible region, a low transmittance in an infrared region and a low sheet resistance. Such a light modulation device may be applied in various uses such as a smart window, a window protecting film, a flexible display element, an active retarder for displaying a 3D image or a viewing angle control film.

22 Claims, 4 Drawing Sheets

(51) Int. Cl.
  *E06B 9/24*     (2006.01)
  *G02F 1/1335*   (2006.01)
  *G02F 1/137*    (2006.01)
  *G02B 5/30*     (2006.01)
  *G02B 5/28*     (2006.01)
  *G02F 1/155*    (2006.01)
  *G02F 1/167*    (2006.01)
  *B60J 3/04*     (2006.01)
  *B60J 7/00*     (2006.01)
  *G02B 26/06*    (2006.01)

(52) U.S. Cl.
  CPC ........... *G02B 5/3016* (2013.01); *G02F 1/137* (2013.01); *G02F 1/13737* (2013.01); *G02F 1/133509* (2013.01); *G02F 1/133512* (2013.01); *G02F 1/155* (2013.01); *G02F 1/167* (2013.01); *B60J 3/04* (2013.01); *B60J 7/00* (2013.01); *E06B 2009/2464* (2013.01); *G02B 26/06* (2013.01); *G02F 2001/13756* (2013.01); *G02F 2001/133521* (2013.01); *G02F 2001/1676* (2013.01); *G02F 2201/083* (2013.01); *G02F 2201/44* (2013.01); *G02F 2203/055* (2013.01)

(58) Field of Classification Search
  CPC ........... G02F 1/133512; G02F 1/13737; G02F 2001/1676; G02F 2001/13756; G02F 2001/133521; G02F 2201/44; G02F 2201/083; G02F 2203/055; G02B 5/282; G02B 5/3016; G02B 26/06; E06B 9/24; E06B 2009/2464; B60J 7/043; B60J 7/00; B60J 3/04
  See application file for complete search history.

(56) References Cited

U.S. PATENT DOCUMENTS

| | | | |
|---|---|---|---|
| 5,604,626 A * | 2/1997 | Teowee | B32B 17/10036 359/265 |
| 6,486,928 B1 | 11/2002 | Lin et al. | |
| 7,303,809 B2 | 12/2007 | Choi et al. | |
| 2006/0228564 A1 | 10/2006 | Demiryont | |
| 2006/0274218 A1* | 12/2006 | Xue | G02F 1/133536 349/16 |
| 2007/0206263 A1 | 9/2007 | Neuman et al. | |
| 2013/0250392 A1* | 9/2013 | Lam | G02F 1/0126 359/244 |
| 2015/0070630 A1* | 3/2015 | Kim | G02F 1/1334 349/86 |
| 2015/0349028 A1* | 12/2015 | Lee | H01L 27/32 349/86 |
| 2016/0018681 A1* | 1/2016 | Chien | G02F 1/1391 349/33 |
| 2016/0097959 A1 | 4/2016 | Bruizeman et al. | |
| 2016/0145736 A1* | 5/2016 | Watanabe | G02B 5/282 204/192.27 |
| 2016/0259224 A1* | 9/2016 | Ozyilmaz | G02F 1/155 |
| 2017/0117674 A1* | 4/2017 | Brown | H01R 25/162 |

FOREIGN PATENT DOCUMENTS

| | | |
|---|---|---|
| JP | H02-208630 A | 8/1990 |
| JP | H09-123337 A | 5/1997 |
| JP | 2000-155308 A | 6/2000 |
| JP | 2002-509272 A | 3/2002 |
| JP | 2003-140193 A | 5/2003 |
| JP | 2005-512122 A | 4/2005 |
| JP | 2006-221070 A | 8/2006 |
| JP | 2009-529153 A | 8/2009 |
| KR | 10-2008-0040439 A | 5/2008 |
| KR | 10-2010-0005549 A | 1/2010 |
| KR | 10-2012-0045543 A | 5/2012 |
| KR | 10-2013-0063485 A | 6/2013 |
| TW | 201337397 A | 9/2013 |

OTHER PUBLICATIONS

Office Action issued for Taiwanese Patent Application No. 104107293 dated Dec. 8, 2015 along with English translation (19 pages).
Office Action issued for Japanese Patent Application No. 2016-533588 dated Jul. 11, 2017, 5 pages.
Extended European Search Report issued for European Application No. 15759163.7 dated Aug. 8, 2017, 10 pages.

* cited by examiner

[Figure 1]
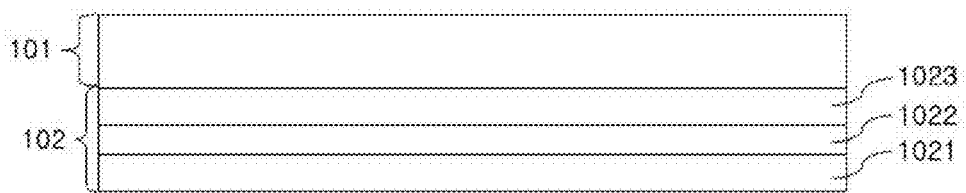
[Figure 2]
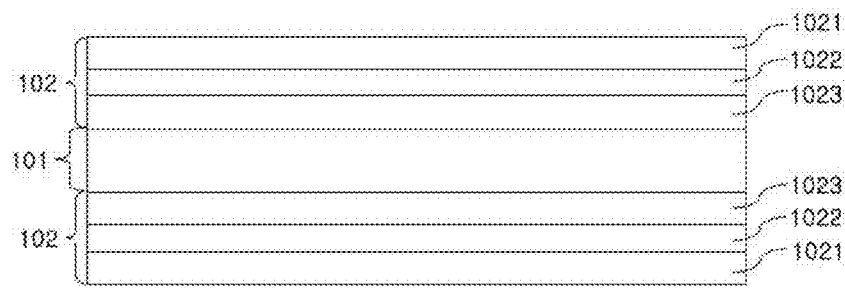

[Figure 3]
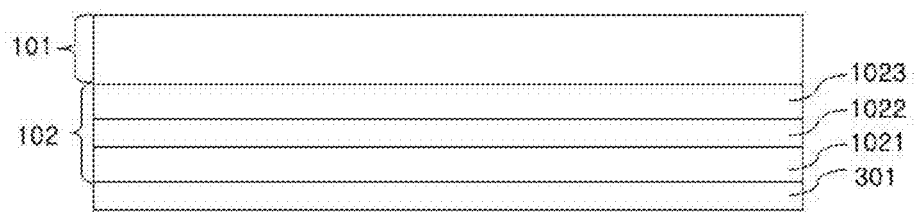
[Figure 4]
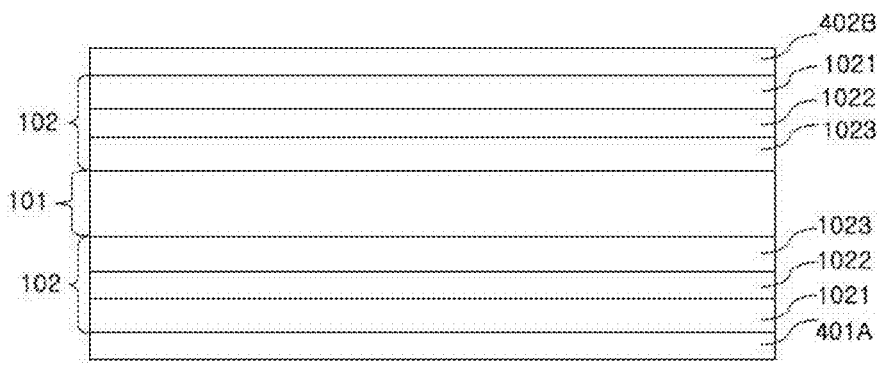

【Figure 5】
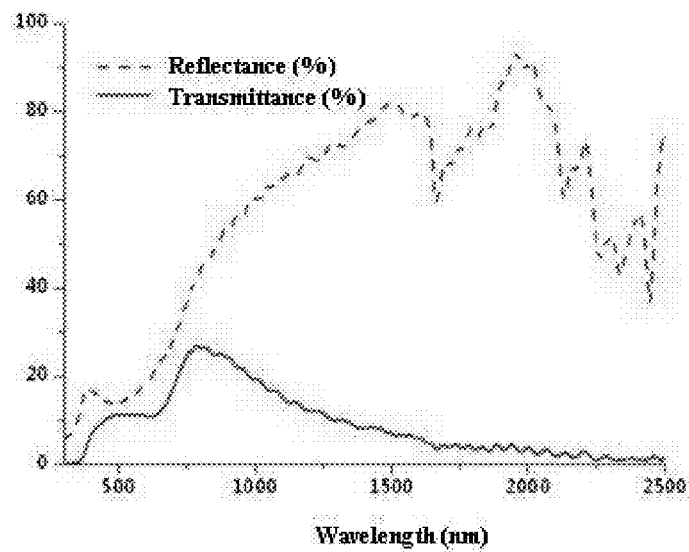
【Figure 6】
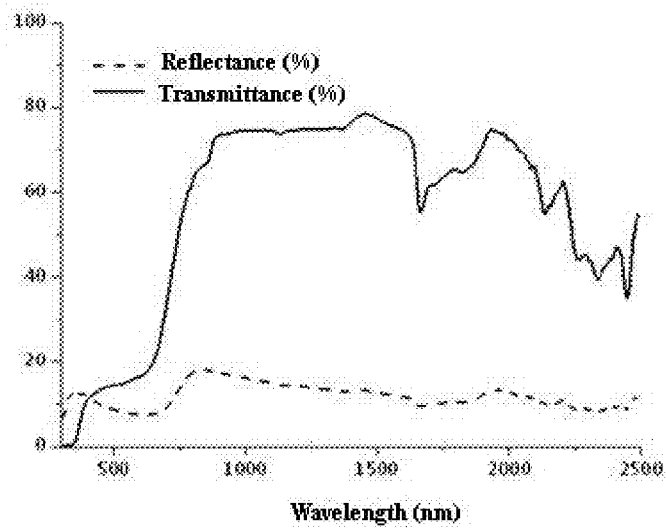

【Figure 7】
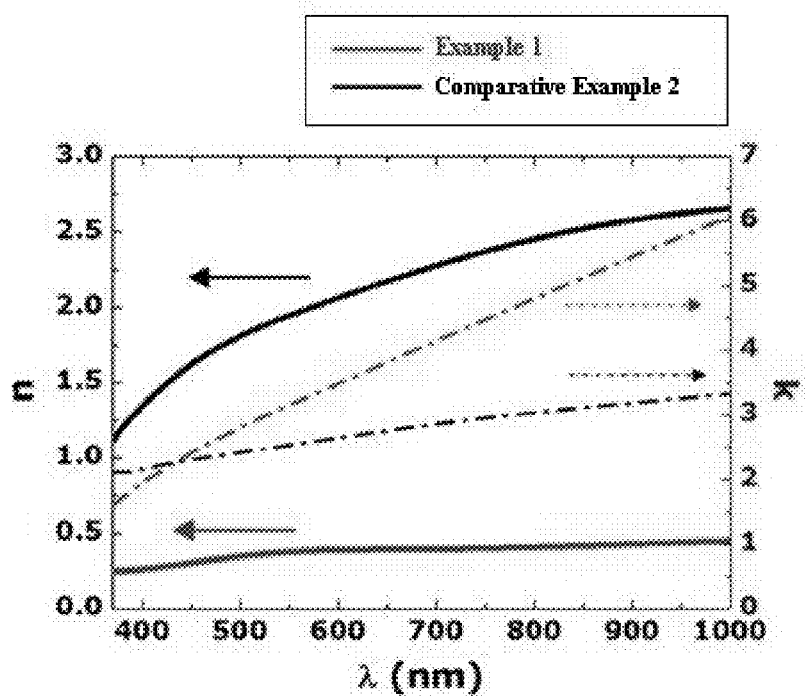
【Figure 8】
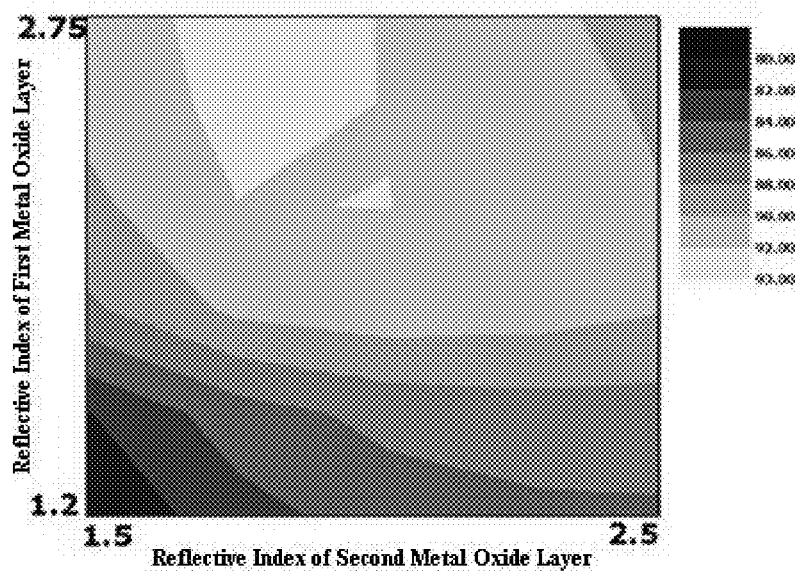

LIGHT MODULATION DEVICE

CROSS-REFERENCE TO RELATED APPLICATIONS

This application is a 35 U.S.C. § 371 National Phase Entry Application from PCT/KR2015/002187, filed on Mar. 6, 2015, and designating the United States, which claims priority under 35 U.S.C. § 119 to Korean Patent Application No. 10-2014-0027222, filed on Mar. 7, 2014, and Korean Patent Application No. 10-2015-0031541, filed on Mar. 6, 2015, the entire contents of which are incorporated herein by reference.

TECHNICAL FIELD

The present application relates to a light modulation device and a use thereof.

BACKGROUND ART

A smart window is a window which can freely control transmittance of solar light, and is called an electron curtain, a transmittance switchable glass, or an illuminated glass.

The smart window consists of, for example, a light transmittance control layer capable of controlling the transmittance of light, and a driving circuit controlling the light transmittance by applying a signal to the light transmittance control layer. The smart window configured as described above is manufactured to transmit light from an entire surface thereof or not to transmit light according to a state of an applied voltage, and has various contrasts by controlling the transmittance.

Recently, as attention to an energy-saving smart window increases, a technique of forming a low emissivity (low-e) coating layer or an electrochromism (EC) coating layer on the smart window has been developed, but the conventional art (Korean Laid-Open Patent Publication No. 2008-0040439) has a limit to satisfy ensuring of a view according to the change in solar light, effective prevention of ultraviolet rays and infrared rays and prevention of leakage of heating generated inside at the same time.

DISCLOSURE

Technical Problem

The present application is directed to providing a light modulation device and a use thereof.

Technical Solution

An exemplary light modulation device includes a light modulation layer, and a composite layer including a first oxide layer, a metal layer and a second oxide layer. In one example, the composite layer may be disposed on one or both sides of the light modulation layer. In addition, the first oxide layer, the metal layer and the second oxide layer may be sequentially formed.

FIGS. 1 and 2 are schematic diagrams of an exemplary light modulation device of the present invention. The light modulation device of FIG. 1 includes a light modulation layer 101 and a composite layer 102 disposed on one side of the light modulation layer and including a first oxide layer 1021, a metal layer 1022 and a second oxide layer 1023, which are sequentially formed. The light modulation device of FIG. 2 includes a light modulation layer 101 and a composite layer 102 disposed on both sides of the light modulation layer and including a first oxide layer 1021, a metal layer 1022 and a second oxide layer 1023, which are sequentially formed.

The term "light modulation device" used herein may be a device driven by a signal applied from outside, for example, a device having a variable light transmittance. The signal applied from outside may be applied by, for example, the composite layer.

In one example, in the light modulation device, the light modulation layer may switch between a transmission mode in which a transmittance in a visible region is in a range of 40 to 90% and a blocking mode in which a transmittance in a visible region is in a range of 5 to 30% according to whether a voltage is applied by the composite layer or not applied. The light modulation device may be in a transmission mode when a voltage is applied, and in a blocking mode when a voltage is not applied, or in a blocking mode when a voltage is applied, and in a transmission mode when a voltage is not applied. This phenomenon is possibly performed by suitably controlling an initial orientation state of a liquid crystal compound and/or a dichroic dye which will be described below. In addition, the range of transmittance in a visible region of the light modulation device is not limited to the above-described range, and may be controlled in more various ranges by suitably controlling an orientation property of the liquid crystal compound or the dichroic dye which will be described below.

In one example, the light modulation layer may be a liquid crystal layer including a liquid crystal compound. The "liquid crystal layer" used herein may be a layer formed by encapsulating the liquid crystal compound between two substrates. The liquid crystal compound may be present, for example, in the light modulation layer to change an alignment direction by a signal applied from outside. In this case, the signal applied from outside means all types of signals applied to change alignment of the liquid crystal compound, and as a representative example, a voltage is used.

The liquid crystal compound may be aligned in an initial state, or may not be aligned. The "initial state" used herein may be a state in which an external signal having an influence on the orientation of the liquid crystal compound is not applied. The liquid crystal layer may switch between various modes through the control of the initial alignment state of the liquid crystal compound, and the application of the external signal such as a voltage. In one example, when the liquid crystal compound is aligned in the initial state, the liquid crystal layer may switch between the blocking mode and the transmission mode. In another example, when the liquid crystal compound is not aligned in the initial state, the liquid crystal layer may switch between a scattering mode and a transmission mode.

All types of liquid crystal compounds may be used as long as an orientation direction of the liquid crystal compound may be changed by the application of an external signal. For example, as the liquid crystal compound, a smectic liquid crystal compound, a nematic liquid crystal compound, or a cholesteric liquid crystal compound may be used. In addition, to change the orientation direction by the application of an external signal, the liquid crystal compound may be, for example, a compound not having a polymerizable group or a crosslinkable group.

In another example, the light modulation layer may be a polymer-dispersed liquid crystal (PDLC) layer, a pixel-isolated liquid crystal (PILC) layer, a suspended particle device (SPD), or an electrochromic device (ECD).

In the specification, the polymer-dispersed liquid crystal (PDLC) layer is a superordinate concept including, for example, a polymer network liquid crystal layer or a polymer stabilized liquid crystal layer. The polymer-dispersed liquid crystal (PDLC) layer may include, for example, a polymer network and a liquid crystal region including a liquid crystal compound dispersed in a phase separation state from the polymer network. Here, the liquid crystal compound may be present to switch orientations in the polymer network.

The polymer network may be a polymer network of a precursor material including a polymerizable or crosslinkable compound, and the polymerizable or crosslinkable compound may form a polymer network in a polymerized or crosslinked state. As the polymerizable compound, for example, a compound having at least one polymerizable or crosslinkable functional group known to form the polymer network of the PDLC layer. As the polymerizable or crosslinkable functional group, for example, an alkenyl group, an epoxy group, a cyano group, a carboxyl group, a (meth) acryloyl group or a (meth)acryloyloxy group may be used, and according to one exemplary embodiment of the present application, a compound having a (meth)acryloyl group may be used, but the present application is not limited thereto.

In the polymer-dispersed liquid crystal layer, as the liquid crystal compound, the same compound as described in the category of the liquid crystal layer including the liquid crystal compound may be used. That is, in the polymer-dispersed liquid crystal layer, as the liquid crystal compound, a smectic liquid crystal compound, a nematic liquid crystal compound or a cholesteric liquid crystal compound may be used. The liquid crystal compound may not be linked with the polymer network, and may be changed in orientation when a voltage is applied from outside. To this end, for example, the liquid crystal compound may use a liquid crystal compound not having a polymerizable or crosslinkable group.

Generally, the liquid crystal compound is not oriented in the polymer-dispersed liquid crystal layer. Accordingly, the polymer-dispersed liquid crystal layer is opaque when a voltage is not applied, and such a state may be referred to as a scattering mode. When a voltage is applied to the polymer-dispersed liquid crystal layer, the liquid crystal compound is aligned according to the voltage and becomes transparent, and thus it is possible to switch between the transmission mode and the scattering mode. However, the state in which a voltage is not applied to the polymer-dispersed liquid crystal layer is not limited to that described above, and the liquid crystal compound may be oriented by disposing an orientation film adjacent to the polymer-dispersed liquid crystal layer or using an orientable polymer network.

The pixel-isolated liquid crystal layer used herein means, for example, a liquid crystal layer to which a partition structure is introduced by pixel to maintain a gap of a cell. The pixel-isolated liquid crystal layer may include a liquid crystal compound which can change an alignment direction by a signal applied from outside. The pixel-isolated liquid crystal layer may also control light transmittance using the alignment state of the liquid crystal compound.

The suspended particle device used herein includes, for example, a structure in which a thin film laminate of nano-scale rod-shaped particles is suspended in liquid crystal. For example, in the suspended particle device, when an external signal is not applied, suspended particles may not be aligned and thus block and absorb light, and when an external signal is applied, suspended particles may be aligned and thus transmit light.

The electrochromic device used herein means, for example, a device using a phenomenon in which light transmittance of an electrochromic material is changed by an electrochemical redox reaction. The electrochromic material included in the ECD may not have a color when an electrical signal is not applied, but have a color when an electrical signal is applied, and therefore, can control light transmittance.

In one example, the light modulation layer may include a dichroic dye. When including both of the liquid crystal compound and the dichroic dye, the light modulation layer may serve as a guest-host-type light modulation layer. That is, the guest-host-type light modulation layer exhibits an anisotropic light absorbing effect by that the dichroic dye is arranged along the arrangement of the liquid crystal compound and that light parallel to an alignment direction of the dye is absorbed and light vertical to the alignment direction of the dye is transmitted.

The term "dye" used herein may mean a material which can intensively absorb and/or transform light in at least a partial or entire range in a wavelength range of 400 to 700 nm, and the term "dichroic dye" used herein may mean a material enabling anisotropic absorption of light in at least a partial or entire range of the visible region. When the light modulation layer is applied to the light modulation device, the expression of a color and light transmittance may be controlled using the dichroic dye as described above. As the dichroic dye, for example, a black dye or a color dye may be used. The dichroic dye may have a dichroic ratio, that is, a value obtained by dividing the absorption of polar light parallel to a major axis direction of the dichroic dye by the absorption of polar light vertical to the major axis direction of the dichroic dye, of 5 or more, 6 or more, or 7 or more. The dye may satisfy the dichroic ratio at least in a partial wavelength range or at one wavelength in the wavelength range of approximately 380 to 700 nm or approximately 400 to 700 nm. As the dichroic ratio increases, it is effective on improving a blocking ratio or expressing a color, and the upper limit of the dichroic ratio is not particularly limited. Thus, any dichroic dye having a suitable dichroic ratio may be selected and used in consideration of a desired degree of color expression. The upper limit of the dichroic ratio may be, for example, approximately 20, 18, 16 or 14. A type of the dichroic dye is not particularly limited, and for example, all types of dyes known to have the above-described characteristics and to be oriented according to the orientation of the liquid crystal compound may be used.

In the application, the composite layer may serve as an electrode layer which can apply an external signal, for example, a voltage, to the light modulation layer. The composite layer has a high transmittance to light in a visible region, and has a high electric conductivity and a low sheet resistance. In addition, since the composite layer has a low transmittance to light in an infrared region, it has an effect of blocking heat. Accordingly, such a composite layer may save energy and may be useful to be an electrode layer of the light modulation device.

In one example, the composite layer may have a transmittance in a visible region, for example, a transmittance to light at any one wavelength in the range of approximately 400 to 700 nm or light at a wavelength of 550 nm, of 80% or more, 85% or more, or 90% or more. The composite layer satisfying the value range may be useful to be a transparent electrode in the light modulation device. However, the light transmittance in the visible region of the composite layer is not limited to the above-described value range, and may have a light transmittance in the visible region as much as possible to be used as the transparent electrode generally.

In one example, the composite layer may have a transmittance to light in an infrared region, for example, light at any one wavelength in the range of approximately 700 to 1000 nm or light at a wavelength of 780 nm or more, of 70% or less, 65% or less, or 60% or less. The composite layer satisfying the value range may block heat in the infrared region, and thus, for example, can save energy. The lower limit of the light transmittance in the infrared region of the composite layer is not particularly limited, but may be 0 to 5%, for example, when the composite layer is used as an electrode layer of a smart window.

In one example, the composite layer may have a sheet resistance of 20Ω/□ or less, 15Ω/□ or less, or 10Ω/□ or less, and the lower limit may be, but is not particularly limited to, 0.1Ω/□ or more. When the composite layer having a sheet resistance in the above range is applied to the light modulation device, consumption power may be minimized, and thus the efficiency of the light modulation device may be increased. In the specification, the sheet resistance may be measured by a sheet resistance meter generally known in the art.

The light modulation device of the present application includes a composite layer. The composite layer may include a first oxide layer, a metal layer and a second oxide layer, which are sequentially formed. Properties of the composite layer, for example, a light transmittance in a visible and/or infrared region, or a sheet resistance, may be controlled according to, for example, a refractive index, a thickness, an electric conductivity or a material of the first oxide layer, the metal layer or the second oxide layer.

The "oxide layer" used herein may mean a layer including an oxide as a main component, and the "metal layer" used herein may mean a layer including a metal as a main component. In one example, the oxide layer may mean a layer including an oxide at approximately 80 wt % or more, and the metal layer may mean a layer including a metal at approximately 80 wt % or more.

In one example, the refractive index of the first oxide layer may be higher than that of the second oxide layer, and the refractive index of the metal layer may be lower than that of the second oxide layer.

In one example, the metal layer may have a refractive index to light having a wavelength of 550 nm in a range of 0.1 to 1.0, and particularly, 0.1 or more, 0.15 or more, 0.2 or more, 0.25 or more, 0.3 or more, 0.35 or more, 0.4 or more, 0.45 or more or 0.5 or more, and 1.0 or less, 0.95 or less, 0.9 or less, 0.85 or less, 0.8 or less, 0.75 or less, 0.7 or less, 0.65 or less, 0.6 or less or 0.55 or less. In addition, the first oxide layer may have a refractive index to light having a wavelength of 550 nm in a range of 1.2 to 2.8 or 1.9 to 2.75, and particularly, 1.2 or more, 1.25 or more, 1.3 or more, 1.35 or more, 1.4 or more, 1.45 or more, 1.5 or more, 1.55 or more, 1.6 or more, 1.65 or more, 1.7 or more, 1.75 or more, 1.8 or more, 1.85 or more, 1.9 or more, 1.95 or more or 2.0 or more, and 2.8 or less, 2.75 or less, 2.7 or less, 2.65 or less, 2.6 or less, 2.55 or less, 2.5 or less, 2.45 or less, 2.4 or less, 2.35 or less, 2.3 or less, 2.25 or less, 2.2 or less, 2.15 or less, 2.1 or less or 2.05 or less. In addition, the second oxide layer may have a refractive index to light having a wavelength of 550 nm in a range of 1.5 to 2.5, and particularly, 1.5 or more, 1.55 or more, 1.6 or more, 1.65 or more, 1.7 or more, 1.75 or more, 1.8 or more, 1.85 or more, 1.9 or more, 1.95 or more or 2.0 or more, and 2.5 or less, 2.45 or less, 2.4 or less, 2.35 or less, 2.3 or less, 2.25 or less, 2.2 or less, 2.15 or less, 2.1 or less or 2.0 or less. The refractive index may be measured using, for example, an M-2000 apparatus [Manufacturer: J. A. Woollam Co., Inc. (USA)].

When each of the metal layer, the first oxide layer and the second oxide layer satisfies the above range of the refractive index, the composite layer has a high light transmittance in the visible region, and a low light transmittance in the infrared region, and thus can be effectively used as a transparent electrode layer in the energy-saving light modulation device.

The refractive indexes of the first oxide layer, the metal layer and the second oxide layer may be controlled by, for example, a thicknesses, or by controlling a deposition process of each layer. Specifically, a degree of crystallinity may be controlled by controlling a deposition condition of each layer, and although the same thickness and material are used, the refractive index may be different from each other. The deposition process may be performed by a known deposition method, for example, a sputtering method. More specifically, the first oxide layer and the second oxide layer may be deposited by, for example, an RF sputtering method, and the metal layer may be deposited by, for example, a DC sputtering method.

In one example, the thickness of the metal layer may be in a range of 5 nm to 20 nm. More specifically, the thickness of the metal layer may be 5 nm or more, 6 nm or more, 7 nm or more, 8 nm or more, 9 nm or more, 10 nm or more, 11 nm or more or 12 nm or more, and 20 nm or less, 19 nm or less, 18 nm or less, 17 nm or less, 16 nm or less, 15 nm or less, 14 nm or less or 13 nm or less. When the thickness of the metal layer is in the above range, it is easy to control the refractive index of the metal layer in the above range. In addition, when the thickness of the metal layer is in the above range, it is easy to form a continuous film of the metal layer, and thus an excellent electric conductivity and a low resistance may be realized, and the light transmittance in the visible region of the light modulation device may be increased.

In one example, the metal layer may include a conductive metal having a sheet resistance of 20Ω/□ or less, and preferably, 10Ω/□ or less. When the electric conductivity of the conductive metal included in the metal layer is in the above range, the sheet resistance of the composite layer may be decreased, and the efficiency of the light modulation device may be increased.

In one example, the metal layer may include a metal such as silver (Ag), aluminum (Al), platinum (Pt), copper (Cu) or gold (Au). The metal layer may include, for example, silver. In this case, in the process of manufacturing the composite layer or the process of using the composite layer in the light modulation device, by the contact with an air and moisture, a silver oxide may be partially included in the metal layer. When the metal layer includes silver and a silver oxide, the silver oxide may be included at 0.1 wt % or more and 50 wt % or less with respect to 100 wt % of the metal layer.

In one example, the thickness of the first oxide layer may be in a range of 20 nm to 60 nm or 40 nm to 50 nm. More specifically, the thickness of the first oxide layer may be 20 nm or more, 25 nm or more, 30 nm or more, 35 nm or more or 40 nm or more, and 60 nm or less, 55 nm or less, 50 nm or less, or 45 nm or less. When the thickness of the first oxide layer is in the above range, it is easy to control the transmittance to light or refractive index of the first oxide layer in the above range, and thus a default rate of the deposition of the metal layer formed on the first oxide layer may be decreased.

In one example, the thickness of the second oxide layer may be 10 nm to 100 nm, and preferably, 20 nm to 60 nm.

More specifically, the thickness of the second oxide layer may be 10 nm or more, 15 nm or more, 20 nm or more, 25 nm or more, 30 nm or more, 35 nm or more, 40 nm or more, 45 nm or more, or 50 nm or more, and 100 nm or less, 95 nm or less, 90 nm or less, 85 nm or less, 80 nm or less, 75 nm or less, 70 nm or less, 65 nm or less, 60 nm or less, or 55 nm or less. When the thickness of the second oxide layer is in the above range, it is easy to control the transmittance to light or refractive index of the second oxide layer in the above range, and an excellent electric conductivity and a low resistance may be obtained.

In one example, the second oxide layer may have a resistivity of $1.0 \times 10^{-5}$ Ωcm to $1.0 \times 10^{5}$ Ωcm, and preferably, $1.0 \times 10^{-4}$ Ωcm to $1.0 \times 10^{4}$ Ωcm. When the resistivity of the second oxide layer is in the above range, the sheet resistance of the composite layer may be decreased, and thus the efficiency of the light modulation device may be increased.

In one example, each of the first oxide layer and the second oxide layer may include a metal oxide including at least one metal selected from the group consisting of antimony (Sb), barium (B a), gallium (Ga), germanium (Ge), hafnium (Hf), indium (In), lanthanum (La), magnesium (Mg), selenium (Se), silicon (Si), tantalum (Ta), titanium (Ti), vanadium (V), yttrium (Y), zinc (Zn) and zirconium (Zr).

In one example, the second oxide layer may further include at least one second metal selected from the group consisting of gallium (Ga), aluminum (Al), zirconium (Zr), titanium (Ti), niobium (Nb), tantalum (Ta), indium (In) and vanadium (V).

A metal included in the second oxide layer may be a doping material. When the second oxide layer further includes the second metal and is used as an electrode layer in the light modulation device, electron mobility may be improved. Since the second oxide layer has a high refractive property like the first oxide layer, the light transmittance in the visible region of the composite layer may be increased, and the light transmittance in the infrared region of the composite layer may be decreased through an optical design. In addition, since the second oxide layer has an electric conductivity, the electric conductivity of the metal layer is not inhibited, and the composite layer may serve as a transparent electrode having a low emissivity (Low-E) function in various light modulation devices.

In one example, the content of the second metal in the second oxide layer may be 0.1 wt % or more and 10 wt % or less. The refractive index of the second oxide layer may be changed by, for example, the content of the second metal. Accordingly, to realize the maximum light transmittance in the visible region of the composite layer, the content of the second metal in the second oxide layer may need to be controlled. In addition, the second metal included in the second oxide layer affects the electric conductivity of the second oxide layer. When the content of the second metal in the second oxide layer satisfies the above range, the second oxide layer may realize the optimal refractive index and electric conductivity.

In one example, the thickness of the composite layer may be suitably controlled to exhibit the properties of a desired light modulation device. The thickness of the composite layer may be controlled in a range of 50 nm to 300 nm or 70 nm to 200 nm to exhibit, for example, a high light transmittance in the visible region, a low light transmittance in the infrared region, an excellent electric conductivity, and a low resistance.

The composite layer may further include a base layer, and for example, the first oxide layer may be present adjacent to the base layer. FIGS. 3 and 4 show exemplary light modulation devices including a base layer. For example, when the composite layer is present on one side of the light modulation layer, as shown in FIG. 3, a base layer 301, the first oxide layer 1021, the metal layer 1022, the second oxide layer 1023 and the light modulation layer 101 may be sequentially formed. In addition, for example, when the composite layer is present on both sides of the light modulation layer, as shown in FIG. 4, a base layer 401A, the first oxide layer 1021, the metal layer 1022, the second oxide layer 1023, the light modulation layer 101, the second oxide layer 1023, the metal layer 1022, the first oxide layer 1021 and a base layer 401B may be sequentially formed.

As the base layer, a known material may be used without particular limitation. For example, an inorganic film such as a glass film, a crystalline or amorphous silicon film, a quartz or indium tin oxide (ITO) film, or a plastic film may be used. As the base layer, an optically isotropic base layer, an optically anisotropic base layer or polarizing plate such as a retardation layer, or a color filter substrate may be used. For example, when the polarizing plate is present on an inside of the base layer, that is, between the liquid crystal layer and the base layer, although an anisotropic base layer is used as a base layer, a device having a suitable performance may be realized.

As a plastic base layer, a base layer including triacetyl cellulose (TAC); a cyclo olefin copolymer (COP) such as a norbornene derivative; poly(methyl methacrylate) (PMMA); polycarbonate (PC); polyethylene (PE); polypropylene (PP); polyvinyl alcohol (PVA); diacetyl cellulose (DAC); polyacrylate (PAC); polyethersulfone (PES); polyetheretherketone (PEEK); polyphenylsulfone (PPS), polyetherimide (PEI); polyethylene naphthalate (PEN); polyethylene terephthalate (PET); polyimide (PI); polysulfone (PSF); polyarylate (PAR) or an amorphous fluorine resin may be used, but the present invention is not limited thereto. In the base layer, when needed, a coating layer of gold, silver, or a silicon compound such as silicon dioxide or silicon monoxide, or a coating layer of a reflection-preventing layer may be present.

In one example, in the light modulation device, compared to the first oxide layer, the second oxide layer may be closer to the light modulation layer. For example, when the composite layer is present on one side of the light modulation layer, as shown in FIG. 1, the first oxide layer 1021, the metal layer 1022, the second oxide layer 1023 and the light modulation layer 101 may be sequentially formed. In addition, for example, when the composite layer is present on both sides of the light modulation layer, as shown in FIG. 2, the first oxide layer 1021, the metal layer 1022, the second oxide layer 1023, the light modulation layer 101, the second oxide layer 1023, the metal layer 1022 and the first oxide layer 1021 may be sequentially formed.

In one example, in the light modulation device, as shown in FIG. 2, the composite layer may be present on both sides of the light modulation layer. That is, the light modulation layer may be disposed between two composite layers facing each other. In this case, the composite layers present on both sides may have the same structure having the same refractive index, thickness or sheet resistance, or an independent structure having a different refractive index, thickness or sheet resistance.

In addition, the present invention provides a use of the light modulation device. The use of the light modulation device may be, for example, a smart window, a window protecting film, a flexible display element, an active retarder for displaying a 3D image or a viewing angle control film, but the present invention is not limited thereto. A method of constituting the light modulation device is not particularly limited, and as long as the light modulation device is used, a conventional method may be applied.

Effects of Invention

The light modulation device of the present application may apply an external signal by a composite layer having a high transmittance in a visible region, a low transmittance in an infrared region and a low sheet resistance. Such a light modulation device may be applied in various uses such as a smart window, a window protecting film, a flexible display element, an active retarder for displaying a 3D image or a viewing angle control film.

BRIEF DESCRIPTION OF DRAWINGS

FIGS. 1 to 4 show exemplary light modulation devices;
FIG. 5 shows a transmittance and a reflectance of a light modulation device of Example 1;
FIG. 6 shows a transmittance and reflectance of a light modulation device of Comparative Example 1;
FIG. 7 shows properties of a metal layer according to a wavelength according to Example 1 and Comparative Example 2; and
FIG. 8 shows an evaluation result for light transmittance according to refractive indexes of a first metal oxide layer and a second metal oxide layer.

DETAILED DESCRIPTION OF EXEMPLARY EMBODIMENTS

Hereinafter, the above-described contents will be described in detail with reference to Examples and Comparative Examples. However, the scope of the present application is not limited to the following descriptions.

Example 1

Manufacture of Composite Layer

A first metal oxide layer was formed by depositing $CeO_2$ on a glass substrate to a thickness of 35 nm using an RF sputtering method. A composite layer was manufactured by depositing a metal layer consisting of Ag on the first metal oxide layer to a thickness of 10 nm under conditions of 1.5 W/cm$^2$ and 3 mTorr using a DC sputtering method, and depositing a Ga-doped zinc oxide (GZO) layer as a second metal oxide layer on the metal layer to a thickness of 45 nm.

As a result obtained by measuring the refractive index of each layer using an M-2000 apparatus [Manufacturer: J. A. Woollam Co., Inc. (USA)], the refractive index of the first oxide layer at a wavelength of 550 nm was 2.34, the refractive index of the metal layer at a wavelength of 550 nm was 0.19, and the refractive index of the zinc oxide layer at a wavelength of 550 nm was 1.94. In addition, as a result obtained by measuring a visible ray transmittance of the composite layer using a UV-vis spectrometer, a transmittance at a wavelength of 550 nm was 87.2%. In addition, a sheet resistance of the composite layer measured using a sheet resistance meter was less than 10 Ω/□.

Manufacture of Light Modulation Device

A polymer precursor material was prepared by mixing 100 mg of an urethane acrylate multifunctional oligomer (SU530, Mw: 5,000, Soltech), 300 mg of bifunctional acrylate (HDDA, Aldrich), 20 mg of trifunctional acrylate (PETA, Aldrich), 570 mg of monofunctional acrylate (EHA, TCI), 23 mg of a dichroic dye (X12, BASF) and 10 mg of a photoinitiator (Zs-39, Fujifilm), and a liquid crystal composition was prepared by adding 2.3 g of a liquid crystal compound (HPC21600, HCCH) and 20 mg of a dichroic dye (X12, BASF) to the precursor material, adding 20 mg of a ball-type spacer having a diameter of 25 μm, and stirring the resulting mixture in a stirrer for 7 hours. Afterward, the liquid crystal composition was applied to a surface of a second metal oxide layer of the prepared composite layer through bar coating using a mayer bar (#14). A polymer-dispersed liquid crystal layer to which a black dye was introduced was manufactured by stacking the second metal oxide layer of the prepared composite layer on the coated liquid crystal composition in contact with the coated liquid crystal composition, and applying UV for 20 seconds using a 30 mW high pressure mercury lamp.

Example 2

A smart window of Example 2 was manufactured by the same method as described in Example 1, except that a composite layer manufactured by the following method was used as the composite layer.

Manufacture of Composite Layer

A first metal oxide layer was formed by depositing $CeO_2$ on a glass substrate to a thickness of 30 nm using an RF sputtering method. A composite layer was manufactured by depositing a metal layer consisting of Ag on the first metal oxide layer to a thickness of 10 nm under conditions of 1.5 W/cm$^2$ and 3 mTorr through a DC sputtering method, and depositing a Al-doped zinc oxide (AZO) layer on the metal layer as a second metal oxide layer to a thickness of 50 nm.

In this case, the refractive index of the first metal oxide layer at a wavelength of 550 nm was 2.34, the refractive index of the metal layer at a wavelength of 550 nm was 0.19, and the refractive index of the second metal oxide layer at a wavelength of 550 nm was 1.89. In addition, as a result obtained by measuring a visible ray transmittance of the composite layer using an UV-vis spectrometer, a transmittance at a wavelength of 550 nm was 85.5%. In addition, a sheet resistance of the composite layer measured using a sheet resistance meter was less than 10 Ω/□.

Comparative Example 1

A smart window of Comparative Example 1 was manufactured by the same method as described in Example 1, except that an ITO transparent electrode layer was used as a composite layer.

Comparative Example 2

A smart window of Comparative Example 2 was manufactured by the same method as described in Example 1, except that a composite layer manufactured by the following method was used as the composite layer.

Manufacture of Composite Layer

A first metal oxide layer was formed by depositing $CeO_2$ on a glass substrate to a thickness of 35 nm using an RF sputtering method. A composite layer was manufactured by depositing a metal layer consisting of Ag on the first metal oxide layer to a thickness of 10 nm under conditions of 0.5 W/cm$^2$ and 15 mTorr through a DC sputtering method, and depositing a Ga-doped zinc oxide layer (GZO) on the metal layer as a second metal oxide layer to a thickness of 45 nm.

In this case, the refractive index of the first metal oxide layer at a wavelength of 550 nm was 2.34, the refractive index of the metal layer at a wavelength of 550 nm was 1.95, and the refractive index of the zinc oxide layer at a wavelength of 550 nm was 1.94. In addition, a sheet resistance of the metal layer measured by a sheet resistance meter was more than 10Ω/□, and a visible ray transmittance of the metal layer at a wavelength of 550 nm using an UV-vis spectrometer was 46.8%. In addition, a visible ray transmittance of the composite layer at a wavelength of 550 nm using a UV-vis spectrometer was 79.1%, and a sheet resistance of the composite layer measured using a sheet resistance meter was more than 10 Ω/□.

Comparative Example 3

A smart window of Comparative Example 3 was manufactured by the same method as described in Example 2, except that a first metal oxide layer was formed to a thickness of 10 nm, and a second metal oxide layer was formed to a thickness of 80 nm in the manufacture of a composite layer.

A visible ray transmittance of the composite layer measured at a wavelength of 550 nm using a UV-vis spectrometer was 72.6%, and a sheet resistance of the composite layer measured by a sheet resistance meter was more than 10 Ω/□.

Evaluation Example 1: Evaluation of Transmittance and Reflectance of Light Modulation Device The transmittances and reflectances of the light modulation devices manufactured in Examples and Comparative Examples were measured at a state in which the voltage is not applied. Specifically, the transmittances and reflectances were measured using a Solid Spec-3700 [Manufacturer: Shimadzu (Japan)], and shown in FIG. 5 (Example 1) and FIG. 6 (Comparative Example 1). As shown in FIGS. 5 and 6, it was confirmed that a light modulation device of Example using the composite layer of the present application as a transparent electrode layer showed a similar light transmittance in a visible region but a considerably low light transmittance in an infrared region, compared to the light modulation device in Comparative Example 1 using an ITO transparent electrode layer.

Evaluation Example 2: Evaluation of Refractive Index and Absorption Coefficient of Metal Layer According to Wavelength The refractive indexes and absorption coefficients of the metal layers manufactured in Example 1 and Comparative Example 2 were evaluated according to wavelength, and shown in FIG. 7. In FIG. 7, n means a refractive index of the metal layer according to a wavelength of light, λ means a wavelength of light, and k means an absorption coefficient of the metal layer according to a wavelength of light. As shown in FIG. 7, it was confirmed that, although the metal layer was formed to the same thickness, the refractive index and the absorption coefficient were different according to a condition for forming the metal layer.

Evaluation Example 3: Evaluation of Transmittance of Composite Layer According to Refractive Indexes of First and Second Metal Oxide Layers A light modulation device was manufactured by the same method as Examples 1 and 2, and the transmittance of the composite layer with respect to light having a wavelength of 550 nm according to refractive indexes of the first and second metal oxide layers was evaluated by changing refractive indexes of the first and second metal oxide layer, and shown in FIG. 8. As shown in FIG. 8, it was confirmed that the light transmittance of the composite layer is affected by the refractive indexes of the first and second metal oxide layers, and particularly, when the refractive indexes of the first metal oxide layer and the second metal oxide layer were included in the above range of the present application, it was determined that an excellent light transmittance of approximately 80% or more with respect to light having a wavelength of 550 nm was exhibited.

BRIEF DESCRIPTION OF MAIN PARTS IN THE DRAWINGS

101: a light modulation layer
102: a composite layer
1021: a first oxide layer
1022: a metal layer
1023: a second oxide layer
301, 401A, 401B: a base layer

What is claimed is:

1. A light modulation device, comprising:
   a light modulation layer; and
   a composite layer including a first oxide layer, a metal layer and a second oxide layer, which are sequentially formed on one or both sides of the light modulation layer, and has a transmittance to light having a wavelength of 550 nm of 80% or more, and a transmittance to light having a wavelength of 780 nm or more of 70% or less,
   wherein the light modulation layer is installed to be driven by a signal applied by the composite layer.

2. The device according to claim 1, wherein the light modulation layer switches between a transmission mode in which a transmittance in a visible region is 40 to 90% and a blocking mode in which a transmittance in a visible region is 5 to 30% according to whether a voltage is applied or not applied by the composite layer.

3. The device according to claim 1, wherein the light modulation layer is a liquid crystal layer including a liquid crystal compound.

4. The device according to claim 1, wherein the light modulation layer is a polymer-dispersed liquid crystal (PDLC) layer, a pixel-isolated liquid crystal (PILC) layer, a suspended particle device (SPD) or an electrochromic device (ECD).

5. The device according to claim 1, wherein the light modulation layer includes a dichroic dye.

6. The device according to claim 5, wherein the dichroic dye is a black dye.

7. The device according to claim 1, wherein the composite layer has a sheet resistance of 20Ω/□ or less.

8. The device according to claim 1, wherein a refractive index of the first oxide layer is higher than that of the second oxide layer, and a refractive index of the metal layer is lower than that of the second oxide layer.

9. The device according to claim 8, wherein the metal layer has a refractive index at a wavelength of 550 nm of 0.1 to 1.

10. The device according to claim 1, wherein the metal layer has a thickness of 5 to 20 nm.

11. The device according to claim 1, wherein the metal layer includes a conductive metal having a sheet resistance of 20Ω/□ or less.

12. The device according to claim 8, wherein the refractive index of the first oxide layer with respect to light having a wavelength of 550 nm is in a range of 1.2 to 2.8, and the refractive index of the second oxide layer with respect to light having a wavelength of 550 nm is in a range of 1.5 to 2.5.

13. The device according to claim 1, wherein the first oxide layer has a thickness of 20 nm to 60 nm.

14. The device according to claim 1, wherein the second oxide layer has a thickness of 10 nm to 100 nm.

15. The device according to claim 1, wherein the second oxide layer has a resistivity of $1.0 \times 10^{-5}$ Ωcm to $1.0 \times 10^{5}$ Ωcm.

16. The device according to claim 1, wherein each of the first oxide layer and the second oxide layer is a metal oxide layer including at least one selected from the group consisting of antimony (Sb), barium (Ba), gallium (Ga), germanium (Ge), hafnium (Hf), indium (In), lanthanum (La), magnesium (Mg), selenium (Se), silicon (Si), tantalum (Ta), titanium (Ti), vanadium (V), yttrium (Y), zinc (Zn) and zirconium (Zr).

17. The device according to claim 16, wherein the second oxide layer further includes at least one second metal selected from the group consisting of gallium (Ga), aluminum (Al), zirconium (Zr), titanium (Ti), niobium (Nb), tantalum (Ta), indium (In) and vanadium (V).

18. The device according to claim 17, wherein a content of the second metal in the second oxide layer is 0.1 wt % or more, and 10 wt % or less.

19. The device according to claim 1, wherein the second oxide layer is disposed closer to the light modulation layer than the first oxide layer.

20. The device according to claim 1, wherein the composite layer is present on both sides of the light modulation layer.

21. The device according to claim 1, wherein the composite layer has a thickness of 50 nm to 300 nm.

22. A smart window, comprising:
the light modulation device of claim 1.

* * * * *